US010040919B2

(12) United States Patent
Fitch (10) Patent No.: US 10,040,919 B2
(45) Date of Patent: Aug. 7, 2018

(54) INLINE MATTE COATED POLYESTER (71) Applicant: TORAY PLASTICS (AMERICA), INC., North Kingstown, RI (US)

(72) Inventor: John Fitch, Middletown, RI (US)

(73) Assignee: TORAY PLASTICS (AMERICA) INC. RI (US)

( * ) Notice: Subject to any disclaimer, the term of this patent is extended or adjusted under 35 U.S.C. 154(b) by 289 days.

(21) Appl. No.: 15/011,633

(22) Filed: Jan. 31, 2016

(65) Prior Publication Data

US 2017/0218153 A1  Aug. 3, 2017

(51) Int. Cl.
*C08J 7/04* (2006.01)
(52) U.S. Cl.
CPC ........... *C08J 7/047* (2013.01); *C08J 2367/00* (2013.01); *C08J 2467/00* (2013.01)
(58) Field of Classification Search
CPC .................................................. C08J 7/047
USPC ....................................................... 428/323
See application file for complete search history.

(56) References Cited

U.S. PATENT DOCUMENTS

| | | | |
|---|---|---|---|
| 5,906,823 A | 5/1999 | Mixon | |
| 6,315,987 B1 | 11/2001 | Plochocka | |
| 6,884,741 B2 | 4/2005 | Batdorf | |
| 6,982,337 B1 | 1/2006 | Kahn | |
| 7,128,968 B2 | 10/2006 | Konrad et al. | |
| 7,960,010 B2 | 6/2011 | Kliesch et al. | |
| 8,613,829 B2 | 12/2013 | Anderson et al. | |
| 8,900,696 B2 | 12/2014 | Kliesch et al. | |
| 2004/0151897 A1 | 8/2004 | Konrad et al. | |
| 2010/0247889 A1* | 9/2010 | Kliesch | C08J 7/065 428/220 |
| 2014/0065398 A1* | 3/2014 | Siu | C08J 5/18 428/220 |
| 2014/0124128 A1* | 5/2014 | Moritz | B32B 37/025 156/233 |

FOREIGN PATENT DOCUMENTS

EP    2 404 736    1/2012

OTHER PUBLICATIONS

International Search Report and Written Opinion dated Apr. 19, 2017 in corresponding International Patent Application No. PCT/IB2017/050245.

* cited by examiner

*Primary Examiner* — Doris L Lee
(74) *Attorney, Agent, or Firm* — Davé Law Group, LLC; Raj S. Davé

(57) ABSTRACT

A multi-layer biaxially oriented polyester (BOPET) film having at least one BOPET film layer and at least one coating layer comprising a polyester polymer and particles that are partially or fully embedded in the coating layer is described herein. The particles have an average particle size of about 4 to 8 microns, the coating layer has a gloss of 25 GU or less measured by a 60 degree glossmeter, and the paint adhesion crosshatch test value of the BOPET film as per ASTM D3359-09 is 10% or less.

20 Claims, 9 Drawing Sheets

Silica particles

FIG. 4

Mixed particles are poorly distributed

FIG. 5

Silica particles poorly distributed

FIG. 6

Acrylic binder covering silica

Zygo 3D Images of Example 1(E1) and Comparative Examples 1 to 5 (CE1 to CE5)

Table 3 – Summary of Testing

E= Example
CE = Comparative Example

|  | E1 | CE1 | CE2 | CE3 | CE4 | CE5 |
|---|---|---|---|---|---|---|
| SEM micrographs | | | | | | |
| Coating thickness (microns) | 0.5 | 1.14 | 0.73 | 0.63 | 0.78 | 0.6 |
| Coat weight (gsm) | 0.5 | 1.14 | 0.73 | 0.63 | 0.78 | 0.6 |
| Particle size (microns) | 5.9-7.6 | 5.9-7.6 | NA | NA | 5.9-7.6 | 5.9-7.6 |
| Gloss (GU) | 20 | 34 | 46 | 37 | 15 | 31 |
| Paint Adhesion Xhatch Test ASTM D3359-09 | 0% Paint removal | 10% | 30% | 30% | 20% | 10% |
| Viscosity (cps) | 80 | 80 | 75 | 40 | 35 | 40 |
| Process | inline | offline | inline | inline | inline | inline |
| Pigment in coating (%) | 6 | 6 | 5.6 | 8.3 | 5.5 | 5 |
| Coating Binder Type | polyester | polyester | polyester | polyester | acrylic | polyester |

FIG. 11

Table 4 – Zygo Roughness Data

Zygo is a 3D Surface profiler which is a white light interferometer system. It can offer fast, non-contact high precision 3D surface measurement and roughness data.

| Example (E) or Comparative Example (CE) | H nanometer | Ra nanometer | Rms nanometers | Rku nanometer | gloss Gloss units |
|---|---|---|---|---|---|
| E1 | 429 | 154 | 549 | 127 | 20 |
| CE1 | 414 | 112 | 302 | 72 | 34 |
| CE2 | 733 | 196 | 422 | 250 | 46 |
| CE3 | 675 | 174 | 257 | 114 | 37 |
| CE4 | 549 | 164 | 322 | 129 | 35 |
| CE5 | 312 | 80 | 217 | 458 | 40 |
|  |  |  |  |  |  |
|  |  |  |  |  |  |
| H=height |  |  |  |  |  |
| Rku = randomness of heigths |  |  |  |  |  |
| Ra = mean deviation |  |  |  |  |  |
| rms=root mean sq roughness |  |  |  |  |  |

FIG. 12

Figure 12:
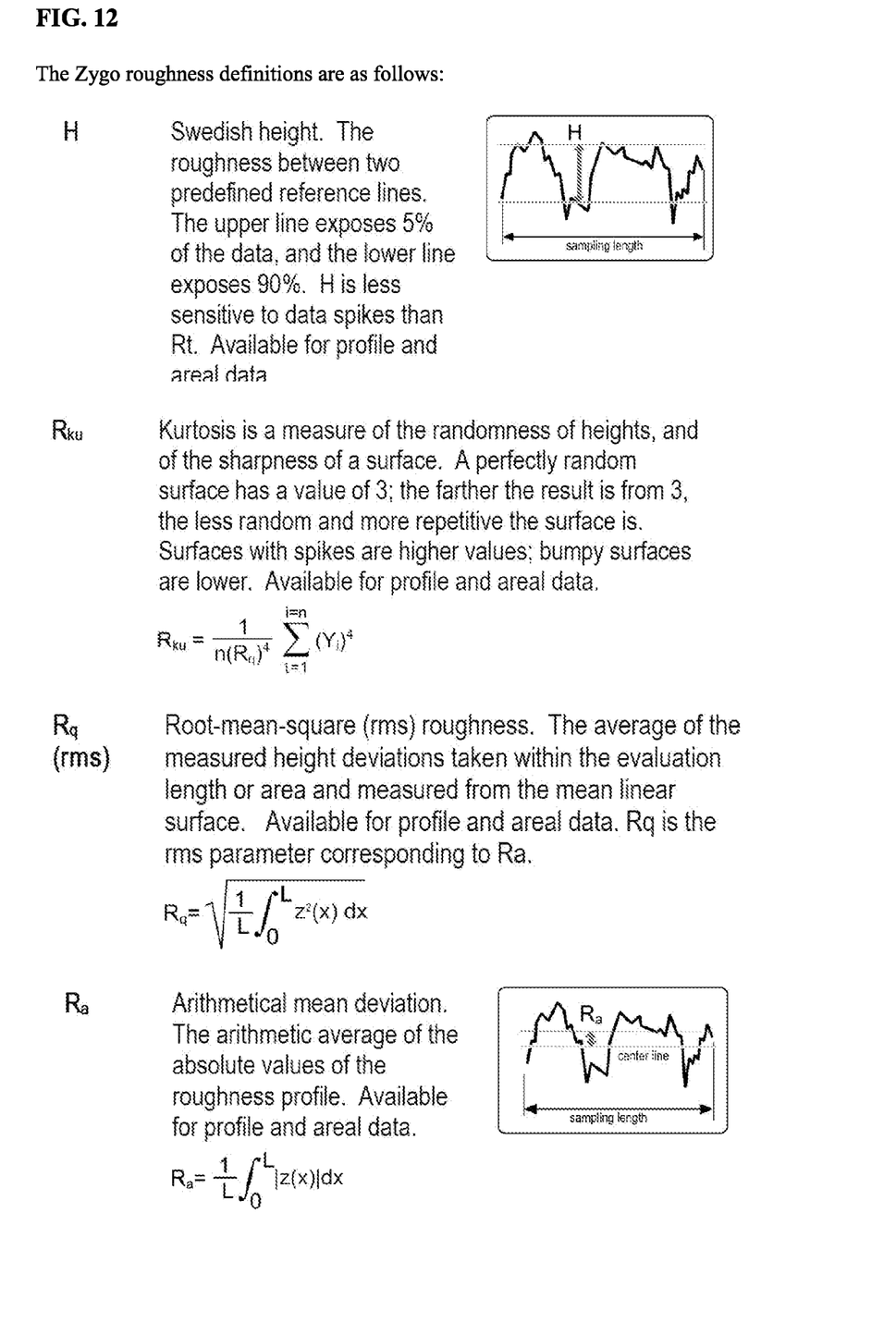
FIG. 12 shows the Zygo roughness definitions for Table 4.

The Zygo roughness definitions are as follows:

H     Swedish height. The roughness between two predefined reference lines. The upper line exposes 5% of the data, and the lower line exposes 90%. H is less sensitive to data spikes than Rt. Available for profile and areal data

$R_{ku}$     Kurtosis is a measure of the randomness of heights, and of the sharpness of a surface. A perfectly random surface has a value of 3; the farther the result is from 3, the less random and more repetitive the surface is. Surfaces with spikes are higher values; bumpy surfaces are lower. Available for profile and areal data.

$$R_{ku} = \frac{1}{n(R_q)^4} \sum_{i=1}^{i=n} (Y_i)^4$$

$R_q$ (rms)     Root-mean-square (rms) roughness. The average of the measured height deviations taken within the evaluation length or area and measured from the mean linear surface. Available for profile and areal data. Rq is the rms parameter corresponding to Ra.

$$R_q = \sqrt{\frac{1}{L} \int_0^L z^2(x)\, dx}$$

$R_a$     Arithmetical mean deviation. The arithmetic average of the absolute values of the roughness profile. Available for profile and areal data.

$$R_a = \frac{1}{L} \int_0^L |z(x)|\, dx$$

INLINE MATTE COATED POLYESTER

FIELD OF INVENTION

This invention relates to a multi-layer biaxially oriented polyester (BOPET) film with a low coat weight matte coating, optionally with antimicrobial properties, excellent paint and ink adhesion properties, and a heat sealable amorphous polyester (APET) layer on the obverse side. More particularly, the invention relates to (a) a new film that has an antimicrobial, matte coating on one side and optionally a heat sealable layer coextruded on the obverse side and (b) an inline process for making the new film, thereby producing the same matte surface with a thin coating than that attained by offline application of the matte coating to the film.

BACKGROUND OF INVENTION

BOPET films with a low coat weight matte coating, antimicrobial properties, and excellent paint and ink adhesion properties are desirable for multiple applications such as food packaging, decorative, label and solar window film to name a few.

The food packaging industry commonly uses BOPET in many heat sealable applications to take advantage of the intrinsic properties of BOPET such as clarity and tensile strength. Typically, a heat sealable layer is a layer of a polymer that will melt at an elevated above room temperature, e.g., between 375° F.-425° F., thereby forming a bond with another substrate when pressed together with heat and pressure.

BOPET can be coextruded to yield 2 distinct layers, an APET (amorphous polyester) layer, which is suitable for heat sealing because of its lower Tg or can be used as an adhesion promoting surface, and a CPET (crystallized polyester) layer. Typically, an amorphous polyester layer contains distribution of polymer chains that are completely random allowing the onset of molecular motion to take place at lower temperatures than the crystallization temperature of the polyester) Also, physical stretching (orientation) of polyester at a temperature below the melting point can create a three dimensional ordered phase. This ordered phase can result in crystallinity and determine the crystalline properties of the polymer such as density, optical clarity, modulus and mechanical response.

Typically, a matte finish coating is applied after the machine direction orientation (MDO) and the wet coating is dried simultaneously as the film is being oriented in the transverse direction. (TDO). U.S. Pat. No. 5,906,823 discloses Triclosan as an antimicrobial additive in PVC films for gloves. Triclosan (IUPAC name: 5-chloro-2-(2,4-dichlorophenoxy)phenol) is an antibacterial and antifungal agent found in consumer products, including soaps, detergents, toys, and surgical cleaning treatments.

U.S. Pat. No. 6,884,741 discloses a water based antimicrobial in a porous sheeting substrate. U.S. Pat. No. 7,960,010 discloses silver zeolite particles as an antimicrobial additive in an extruded layer. U.S. Pat. No. 8,613,829 discloses the addition of antimicrobials to paper substrates. U.S. Pat. No. 8,900,696 discloses ammonium silanes as antimicrobial additives in a coating on PET but does not disclose that transverse orientation during matte coating can increase matteing efficiency or particle distribution.

Pigment particles are generally added to reduce the gloss of coatings and primers. The increase in particle size generally decreases the gloss of surface coatings.

Typically, high aspect ratio pigments such as clay, vermiculite are aligned parallel to the surface after drying while small sized pigments are lost below the surface of the dried polymer of the coating and do not affect the surface roughness. On rough surfaces the light is diffusely scattered in all directions. The image forming qualities are diminished: A reflected object no longer appears brilliant, but blurred. The more uniform the light is scattered, the less intense the reflection in the main direction and the surface will appear duller. A number of standard parameters are used to describe surface roughness. In the background and embodiments herein, roughness means Rq or root mean square roughness ($R_{RMS}$), i.e., the square root of the sum of the squares of the individual heights and depths from the mean line, defined as:

$$R_q = \sqrt{\frac{1}{n}\sum_{i=1}^{n} y_i^2}$$

The roughness profile contains n ordered, equally spaced points along the trace, and $y_i$ is the vertical distance from the mean line to the $i^{th}$ data point. Height is assumed to be positive in the up direction, away from the bulk material.

Decreasing gloss depends mostly on the surface topography or heights and depths of the surface. In general, coatings with smooth surfaces (where the angle of incidence is equal to the angle of reflection) have high gloss (greater than 70 GU as measured by a byk glossmeter). Rough surfaces diffuse light so they appear dull or not as bright as a smooth surface. As roughness gets higher, light scattering increases which causes gloss to decrease.

Gloss is a measure of reflectivity of light from a coated surface. The angle at which a surface is viewed gives different gloss measurements. Gloss can be measured by devices like the BYK gloss meters made by BYK-Gardner USA, which also give readings at different angles.

Another factor effecting gloss is the dynamics of film shrinkage that occurs during drying of the coating on the film. The resin system that make up the film, the solids content, the amount and type of solvents and the drying method all play a role in film shrinkage, which in turn affects the gloss of the surface. Generally, each resin system exhibits a unique curing phenomenon during drying.

Shrinkage of the coating on the coated film can produce a matte finish of the coating. After applying the coating, the solvent/water starts to evaporate, the viscosity increases, and the coating solidifies, until the final drying when the coating becomes hard and elastic. The evaporation of solvents causes the matting pigments to be distributed throughout the whole coated film, making the coating thickness of the coating to become thinner. This decrease in thickness can produce a micro rough surface. Typically, coatings with high volatile organic compounds are easier to matte than coatings with high solid content. Therefore, UV coatings with nearly 100% or 100% solid content tend to be difficult to matte.

SUMMARY OF THE INVENTION

An embodiment relates to a multi-layer biaxially oriented polyester (BOPET) film comprising at least one BOPET film layer and at least one coating layer comprising a polyester polymer and particles that are partially or fully embedded in the coating layer, wherein the particles have an average particle size of about 4 to 8 microns, the coating layer has a gloss of 25 GU or less measured by a 60 degree glossmeter, and the paint adhesion crosshatch test value as per ASTM D3359-09 is 10% or less.

Preferably, the particles comprise treated silica particles. Preferably, the treated silica particles comprise hydrophobic silica particles. Preferably, the treated silica particles comprise substantially no hydrophilic silica particles. Preferably, the coating layer the particles are 30-60 wt. % of the coating layer. Preferably, the coating layer the particles are 40-50 wt. % of the coating layer. Preferably, the coating layer has a coat weight of 1 gram per square meter (gsm) or less. Preferably, the coating layer has a coat weight of 0.5 gram per square meter (gsm) or less. Preferably, the coating layer further comprises a crosslinking agent. Preferably, the crosslinking agent comprises a carbodiimide crosslinker, a glyoxal crosslinker, a carbodiimide crosslinker, an epoxy functional crosslinker or combinations thereof. Preferably, the coating layer further comprises an antimicrobial additive. Preferably, the antimicrobial additive comprises triclosan. In one embodiment the multi-layer biaxially oriented polyester (BOPET) film could comprise at least two BOPET film layers. Preferably, the coating further comprises a release agent.

Another embodiment relates to a method of manufacturing a multi-layer biaxially oriented polyester (BOPET) film comprising at least one BOPET film layer and at least one coating layer comprising a polyester polymer and particles that are partially or fully embedded in the coating layer, wherein the particles have an average particle size of about 4 to 8 microns, the coating layer has a gloss of 25 GU or less measured by a 60 degree glossmeter, and the paint adhesion crosshatch test value as per ASTM D3359-09 is 10% or less, wherein the coating layer is applied to the at least one BOPET film layer inline during manufacture of the at least one BOPET film layer.

Preferably, the coating is applied to the at least one BOPET film layer after the machine direction orientation (MDO) of the at least one BOPET film layer and the coating is dried during the transverse direction orientation (TDO) of the at least one BOPET film layer. Preferably, the coating layer is applied to the at least one BOPET film layer as a polyester polymer emulsion containing the particles.

Another embodiment relates to a method of manufacturing a multi-layer biaxially oriented polyester (BOPET) film comprising at least one BOPET film layer and at least one coating layer comprising a polyester polymer and particles that are partially or fully embedded in the coating layer, wherein the particles have an average particle size of about 4 to 8 microns, the coating layer has a gloss of 25 GU or less measured by a 60 degree glossmeter, and the paint adhesion crosshatch test value as per ASTM D3359-09 is 10% or less, wherein the coating layer is not applied offline to the at least one BOPET film layer after manufacture the at least one BOPET film layer.

Preferably, the coating is applied to the at least one BOPET film layer after the machine direction orientation (MDO) of the at least one BOPET film layer and the coating is dried during the transverse direction orientation (TDO) of the at least one BOPET film layer. Preferably, the coating layer is applied to the at least one BOPET film layer as a polyester polymer emulsion containing the particles.

DETAILED DESCRIPTION OF THE INVENTION

A matte coated surface is desirable for indoor applications to reduce glare by lowering the gloss. Particle size, type of particle, loading level, polymer type and coating thickness are critical to achieve a low gloss. Other surface properties that have to be considered also are coefficient of friction and adhesion of surface coatings such as inks, paints and other protective top coats. Static COF should be between 0.4-0.6μ by the Tappi Test Method T 815 and adhesion as determined by the tape cross hatch method should have <10% paint removal. See test methods for testing details.

Particle size and type and resin type have been optimized silica particle size between 4.0-6.0 microns is optimal with a polyester resin to achieve a high degree of matteing for a low coat weight inline application. A low coat weight for inline application is 0.3-.0.5 gsm as compared to offline coating which could be 1.0-3.0 gsm.

In addition to a low gloss surface, it is desirable to optionally have antimicrobial properties to be able to use products made from the film in schools and hospitals to reduce exposure to harmful microbes such as gram positive bacterium (*staphylococcus aureus*) and gram negative bacterium (*Escherichia coli*). In one embodiment, Triclosan is one antimicrobial that was found to be significantly effective at low concentrations.

In another embodiment, a crosslinker is added for increasing adhesion to PET and improving the adhesion to coated materials such as paint and ink.

Figure 1A:
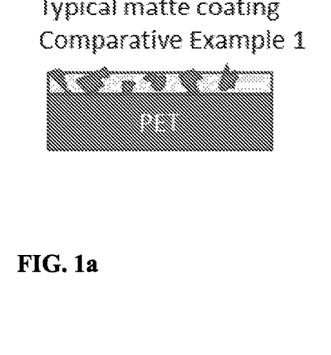
FIG. 1a shows a schematic of a typical offline coated PET film having a coating layer wherein a majority of the particles are nearly fully embedded in the coating layer on the PET film.
Figure 1B:
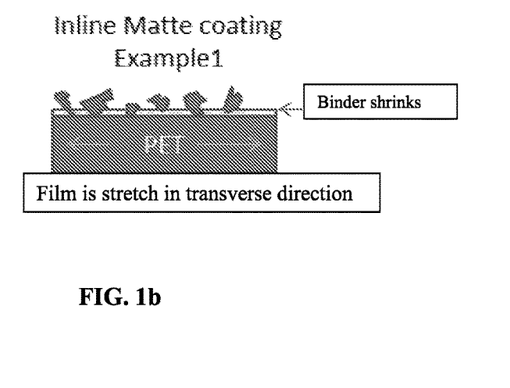
FIG. 1b shows a schematic of the novel inline coated PET film having a coating layer wherein a majority of the particles are only partially embedded in the coating layer on the PET film.

Another embodiment relates to applying a coating (e.g., the matte finish material such as a coating emulsion) inline during the film making process. This evenly distributes the particles to improve the matte effect as shown in FIGS. 1a and 1b. Inline coating of the matte finish material also reduces cost by reducing the application coat weight of the coating.

The embodiments herein benefit from the novel orientation process of the orientated PET film to distribute uniformly the particles within the matrix of the coating emulsion. As the coating dries and solvents and water are evaporated in the interstices between particles, the coating polymer shrinks around the particles and loses its volume, dying closer to the substrate. In essence, this leaves the majority of the particles higher above the substrate than a typical offline coating in which a higher percentage of particles are below the surface of the polymer binder as shown in FIGS. 1a and 1b. The particles are also more evenly distributed than a typical offline application. Adding more pigment to the coating and coating offline is an inferior solution to getting more matte effect because it is the combination of height above the surface and the distribution of the particles at the coating surface that produces high matte effect.

The BOPET film of the embodiments herein may comprise one or more layers, preferably at least 2 layers. A multilayered BOPET film may include one or more of each of: an inner layer (i.e., heat seal), an outer layer, and a coating layer. In addition there may be one or more core layers between the inner and outer layers.

BOPET Film

A polyester base film was prepared as follows: Polyethylene terephthalate A can be polymerized by a known method. For example, a melt slurry of ethylene glycol and purified terephthalic acid was heated, in the presence of an esterification catalyst, and water and excess ethylene glycol was removed under vacuum leaving a residual melt of polyester. This melt was discharged via strand die into a cooling trough, pelletized, and then further dried to remove residual moisture to less than about 50 ppm. Trimethylphosphate of 0.032 wt %, magnesium acetate of 0.069 wt %, antimony trioxide of 0.026 wt %, and tetraethyl ammonium hydroxide of 0.252 wt %, were also used to prepare polyester A. External particles were not added to polyester A.

Polyethylene terephthalate B was polymerized by a known method. A melt slurry of ethyleneglycol and purified terephthalic acid was heated, in the presence of an esterification catalyst, and water and excess ethylene glycol were removed under vacuum leaving a residual melt of polyester. This melt was discharged via strand die into a cooling trough, pelletized, and then further dried to remove residual moisture to less than about 50 ppm. Lithium acetate dihydrate of 0.226%, trimethylphosphate of 0.181 wt %, phosphorous acid of 0.020 wt %, antimony trioxide of 0.04 wt %, and calcium acetate of 0.119 wt %, were used to prepare a polyester B.

Particles (A) being $SiO_2$ particles of an average particle size of about 2.6 μm (micrometers), were admixed into polyethylene terephthalate co-polymerized by a known method: A melt slurry of ethyleneglycol and purified terephthalic acid was heated, in the presence of an esterification catalyst, and water and excess ethylene glycol were removed under vacuum leaving a residual melt of polyester. This melt was discharged via strand die into a cooling trough, pelletized, and then further dried to remove residual moisture to less than about 50 ppm. Tetraethyl ammonium hydroxide of 0.049 wt %, lithium acetate dihydrate of 0.882 wt %, antimony trioxide of 0.039 wt %, and calcium acetate of 0.090 wt %, and trimethylphosphate of 0.042 wt % were also used to prepare polyester C. The content of particles (A) in the polyester pellet (C) was 2.0%.

Next, 48.5 parts by weight of polyester pellets (A), 48.5 parts by weight of polyester pellets (B), and 3.0 parts by weight of polyester pellets (C), were mixed. The mixed pellets were extruded using a vent type two-screw extruder to produce melt stream (I). Next, 48.5 parts by weight of pellets (A), 48.5 parts by weight of pellets (B), and 3.0 parts by weight of pellets (C), were mixed. Up to about 55% recycle consisting of finished film can replace equal parts of polymer A and polymer B.

An amorphous co-extruded surface layer for the polyester thermoplastic film was prepared as follows. An isophthalic acid co-terephthalic acid random co-polyester co-polymer with an IV of about 0.65 and a mol ratio of about 18% isophthalic acid and 82% terephthalic acid, commercially available from Invista as 8906™, was co-extruded on a base sheet of polyethyleneterephthalate. The base sheet of polyethyleneterephthalate can be prepared as described above for the core layer. Alternatively, a co-polyester consisting of a random co-polymer of cyclohexane dimethanol residues, commercially available from Eastman Chemical, with an IV of about 0.70 can be utilized as the amorphous layer. The thickness of the amorphous layer was set to about 0.5 μm.

The high crystalline PET layer and amorphous layer were extruded, combined in a feedblock assembly and cast on a cooling drum. Subsequently the two layer structure was oriented in the machine direction using a heated roller train and was then oriented in the cross machine, or TD, direction using a chain driven tenter frame. At the end of the tenter frame the film was heated to lock in the crystallization properties and to enhance the overall mechanical strength of the film. The coating layer is applied to the CPET side after the MD orientation and before the TD orientation. The coating is dried as the film is being oriented and crystallized. The coating is applied by the reverse gravure application method.

BOPET Film Process

Typically, a raw material PET resin is supplied in solid form to a melt processing device, preferably a continuous screw extruder. The heating of the melt processor is controlled to maintain the PET resin above its melting point but below polymer degradation temperature. PET molten resin is extruded from an appropriately shaped die to form a thin, flat ribbon of polymer melt. The polymer ribbon is quenched in air and or on a chilled roll to form a solid, self-supporting film. The film is taken up by sets of rollers turning at different rotation speeds that stretch the film in the direction of continuous forward motion, referred to as the machine direction ("MD"). The stretching can be accompanied by heating of the film to establish crystal orientation in the MD. The mono-directionally oriented film is clamped at its opposite edges in and stretched in the transverse machine direction ("TD") laterally perpendicular to the MD in a tenter oven. The tenter oven is heated to temperatures operative to establish crystal orientation in the TD thus forming a biaxially oriented PET film. Preferably biaxially oriented PET film stretched about 100%-400% in the MD and 100%-600% in the TD. The biaxially oriented film can be heat set at temperatures can be preferably between about 300° F. and about 490° F., more preferably about 350° F. to about 460° F.

Coating Formulations

The coating formulation is defined by the composition and ranges for the composition as shown in Table 1.

An optional ingredient of the coating formulations could be an antimicrobial agent such as triclosan in an amount of 0.10-1.00% weight percent of the coating. Triclosan is an organic compound that is a white powdered solid with a slight aromatic, phenolic odor. Categorized as a polychloro phenoxy phenol, triclosan is a chlorinated aromatic compound that has functional groups representative of both ethers and phenols. Phenols often demonstrate antibacterial properties. Triclosan is soluble in ethanol, methanol, diethyl ether, and strongly basic solutions such as a 1M sodium hydroxide solution, but only slightly soluble in water. Triclosan can be synthesized as disclosed in U.S. Pat. No. 6,982,337 and U.S. Pat. No. 6,315,987.

TABLE 1

| | | | | | | | | |
|---|---|---|---|---|---|---|---|---|
| | | | Formulations | | | | | |
| Ingredient | Type | Coating Process Solids % | E1 Inline Wt % | CE1 Offline Wt % | CE2 Inline Wt % | CE3 Inline Wt % | CE4 inline Wt % | CE5 inline Wt % |
| Integrity 1200-2 ™ | PET emulsion | 30 | 50.4 | 50.1 | 50.1 | 48.7 | | 50.4 |
| Neocryl A1127 ™ | acrylic polymer | 43 | | | | | 35 | |
| Gasil HP 210 ™ | hydrophobic silica | 100 | 6 | 6 | 2.8 | 2.7 | 5.5 | 5 |
| Areosil OX50 ™ | hydrophilic silica | 100 | | | 2.8 | | | |
| AB 12 ™ | PMMA particles | 15 | | | | 5.6 | | |
| Slyojet A30 ™ | silica dispersion | 100 | 0.37 | 0.37 | 0.37 | 0.36 | | 0.37 |
| water | Solvent | NA | 41 | 41.2 | 40.1 | 39.6 | 57 | 41 |
| acetone | solvent | NA | 0.25 | | | | | |
| Isopropanol | solvent | NA | | 0.2 | | | | 0.25 |
| triclosan ™ | antimicrobial | 100 | 0.5 | 0.5 | | | | 0.5 |
| polyphase 678 ™ | antimicrobial | 40 | | | 0.5 | 0.5 | 0.5 | |
| Surfynol 440 ™ | surfactant | NA | 0.09 | 0.09 | 0.09 | 0.09 | | 0.09 |
| Surfynol 420 ™ | surfactant | NA | 0.18 | 0.18 | 0.18 | 0.18 | | 0.18 |
| solucote XL-1 ™ | crosslinker | 40 | | | 3 | 2.7 | | |
| Bercet 2125 ™ | crosslinker | 68 | | | | | 1.7 | |
| Carbolite SW 12G ™ | crosslinker | 40 | 2 | 2 | | | | 2.5 |
| Z 6040 ™ | crosslinker | NA | | | | | 0.4 | |
| Total | | | 100.79 | 100.64 | 99.94 | 100.43 | 100.1 | 100.29 |

E = Example
CE = Comparative Example

The source for each of the ingredients in the coating formulation is shown in Table 2.

TABLE 2

Formulation Ingredients

| Name | Company | Description | particle size micron |
|---|---|---|---|
| Integrity 1200-2 ™ | Lawter International | Polyester emulsion | NA |
| Neocryl A1127 ™ | Neoresins | acrylic emulsion | NA |
| Gasil HP 210 ™ | PQ Corp | hydrophobic silica | 5.9-7.6 |
| Aerosil OX50 ™ | Evonik | hydrophilic silica | 0.04 |
| AB 12 (15%) ™ | Paramelt | PMMA particles | 2.0-4.0 |
| ™ | Grace | silica dispersion | 0.3-0.4 |
| water | NA | solvent | NA |
| Isopropanol | Sigma | solvent | NA |
| Acetone | Sigma | solvent | NA |
| Triclosan ™ | Parchem | antimicrobial | NA |
| polyphase 67 ™ 8 | Troy Corp | antimicrobial | NA |
| Surfynol 440 ™ | Air Products | Ethoxylated Acetylenic Diols. | NA |
| Surfynol 420 | Air Products | Ethoxylated Acetylenic Diols. | NA |
| Solucote XL-1 ™ | DSM Coating Resins | carbodiimide crosslinker | NA |
| Bercet 2125 ™ | Bercet Inc | glyoxal crosslinker | NA |
| carbodilite SW 12G ™ | GSI Exim America | carbodiimide crosslinker | NA |
| Z 6040 ™ | Dow Corning | epoxy functional crosslinker | NA |

EXAMPLES

This invention will be better understood with reference to the following Examples, which are intended to illustrate specific embodiments within the overall scope of the invention.

Example 1

In one embodiment, the coating formulation was prepared by blending the 30% solids integrity 1200-2 polymer emulsion with water to achieve a 15% solids mix. Silica (slyojet A30), and 2 surfactants (surfynol 420/440) were added to this mix to achieve good wetting of the polymer emulsion. 6 wt. % Gasil HP 210 (hydrophobic silica particles) were then added as shown in Table 1 to the mix under high shear with a stator/rotor mixer to fully disperse the silica particles. Triclosan (antimicrobial) was pre-dissolved in acetone and added to the mix. The Carbolite SW 12 G, multifunctional carbodiimide crosslinker was added to the mix just before applying the coating.

The coating was applied to a BOPET film a two layer coextrusion lidding film by an enclosed doctor blade gravure roll. The coating was applied during the BOPET making process which is called in-line coating. The coating was applied after the machine direction orientation (MDO). The coating is dried in the tenter during the transverse direction orientation (TDO). The film/coating is stretched approximately 400%. The coat weight of the coating after transverse orientation was 0.5 gsm. Preferably, the coat weight of the coating should be at 1 gsm or less, more preferably at 0.5 gsm or less, to prevent line breaks by reducing the wet coating thickness. Preferably, a low coat weight is achieved by adequate drying and still maintaining a web speed of 500-600 feet/minute.

Figure 2:
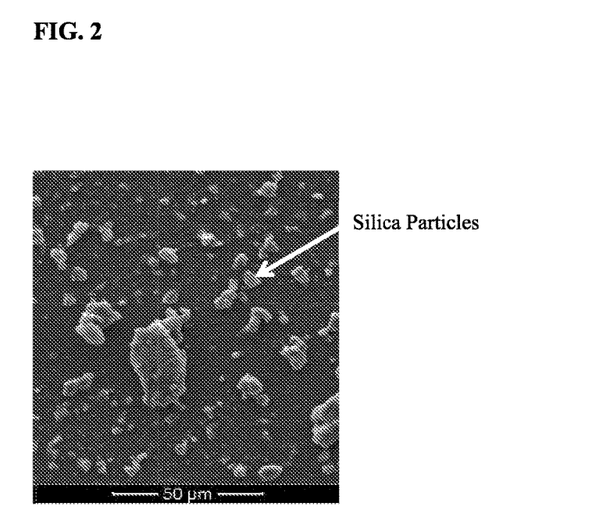
FIG. 2 shows the SEM micrographs showing the surface topography of the coating layer on the coated PET film of Example 1.
Figure 10:
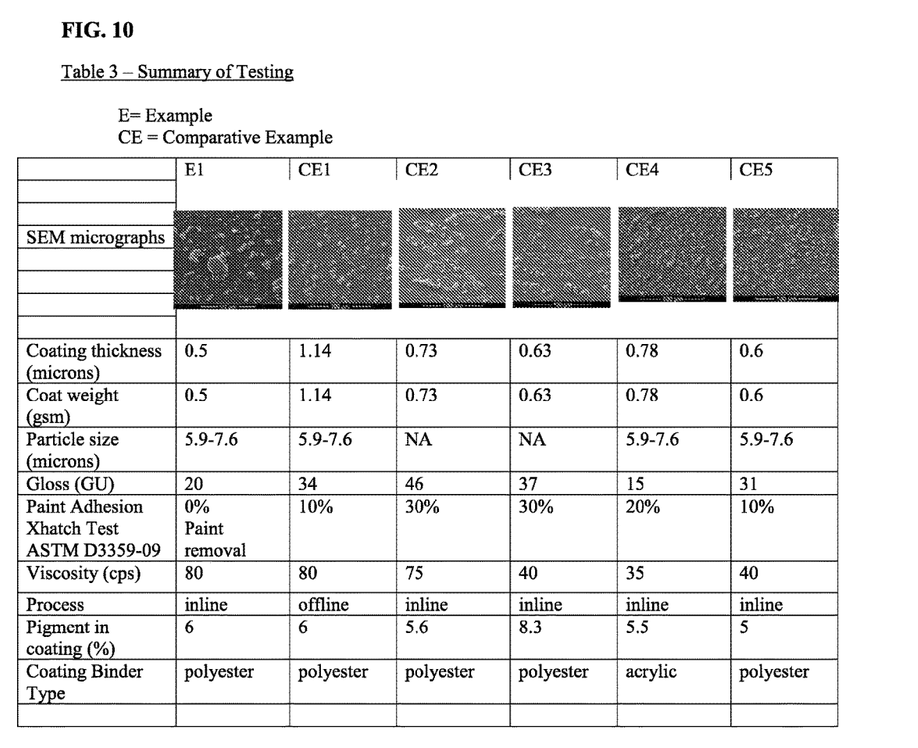
FIG. 10 is Table 3 which summarizes the test results of testing the films of Example 1 and Comparative Examples 1-5.

The SEM micrographs in FIG. 2 show the surface topography of the coating layer on the coated film. The coating has particles with an average particle size of 4.3 microns as indicated in FIG. 10 (Table 3) and 60 degree gloss of 20 gloss units (GU). The coating also has an excellent paint adhesion.

Comparative Example 1

Comparative Example 1 is the same as Example 1 except that the coating was dissolved in isopropanol and applied offline versus inline as shown in Table 1. The coating was applied offline by reverse gravure at a coat weight of about 1.0 gsm. A heavier coating was used to try to achieve the same low gloss as in Example 1. But even with the higher coat weight, the gloss was 37 GU as opposed to 20 GU as in Example 1

Figure 3:
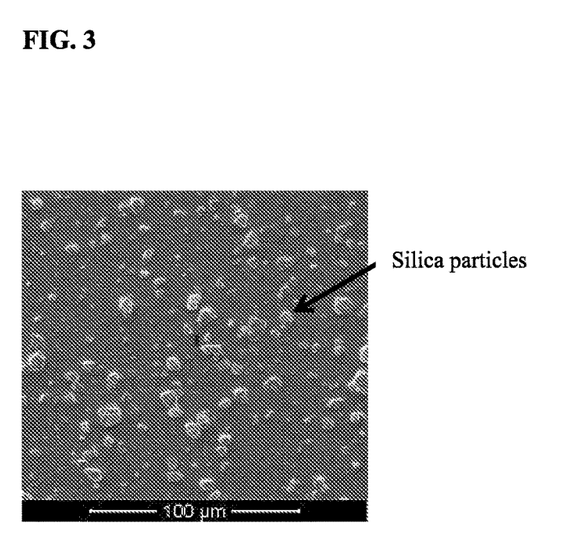
FIG. 3 shows the SEM micrographs showing the surface topography of the coating layer on the coated PET film of Comparative Example 1.

The SEM micrographs shown in FIG. 3 indicate the same particles that were used in Example 1 are more embedded in the resin system than in Example 1 because the film of Comparative Example 1 is not stretched to the same extent as the film of Example 1.

Comparative Example 2

Comparative Example 2 is the same as Example 1 except that two types of particles were used instead of a single type of particles as in Example 1. The two types of particles used in Comparative Example 2 were 2.8 wt. % Gasil HP 210 (hydrophobic silica particles) and 2.8 wt. % Areosil OX (hydrophilic silica particles) as shown in Table 1. The coating was applied inline. However, the coat weight was higher and gloss was higher even though the silica particle loading was about the same as that in Example 1.

Figure 4:
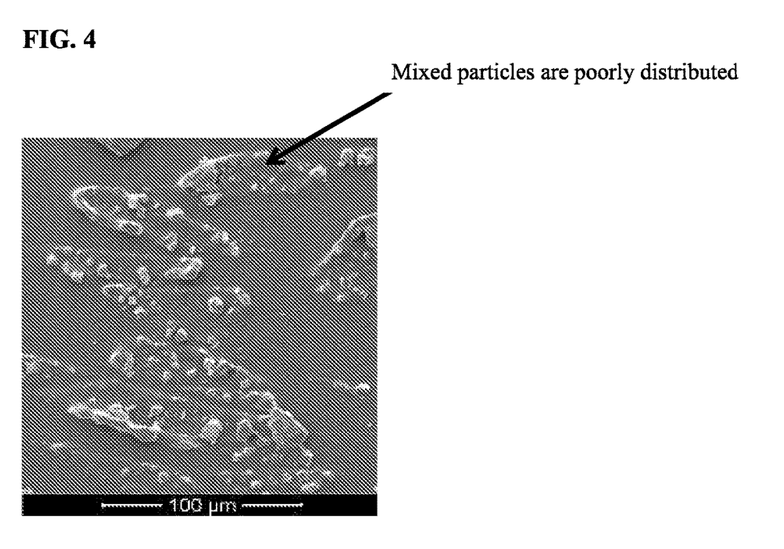
FIG. 4 shows the SEM micrographs showing the surface topography of the coating layer on the coated PET film of Comparative Example 2.

The SEM micrographs shown in FIG. 4 show a surface that has a rough particle with the highest particle height but it does not have an equal distribution of particles on the surface.

Comparative Example 3

Figure 5:
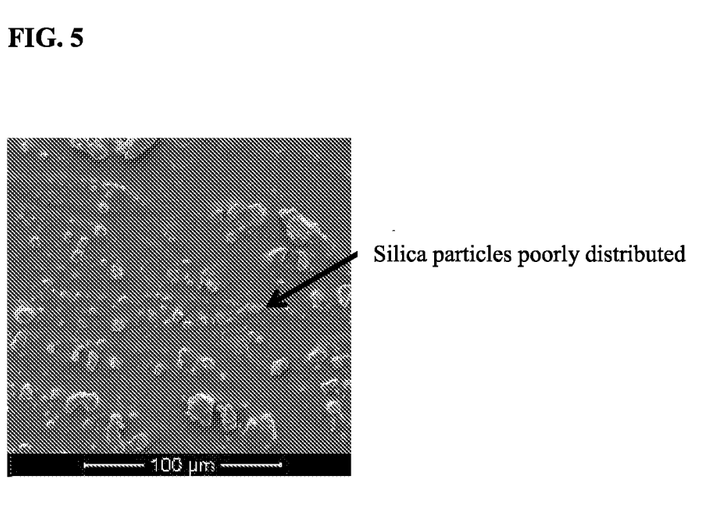
FIG. 5 shows the SEM micrographs showing the surface topography of the coating layer on the coated PET film of Comparative Example 3.

Comparative Example 3 is the same as Example 1 except that two types of particles were used: 2.7 wt. % Gasil HP 210 (hydrophobic silica particles) and 5.6 wt. % AB 12 15% (PMMA particles) as shown in Table 1. Thus, the 16% polyester base coating had higher particles to binder ratio. The SEM micrographs in FIG. 5 show that the PMMA particles to boost particle level did not lower the gloss. It caused poor particle distribution and lower paint adhesion.

Comparative Example 4

Figure 6:
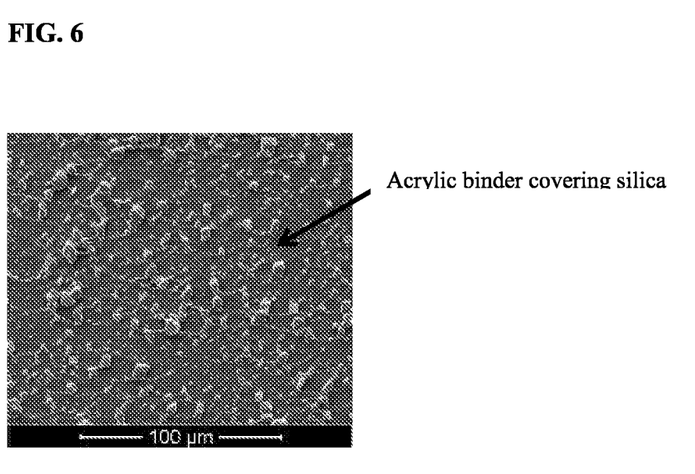
FIG. 6 shows the SEM micrographs showing the surface topography of the coating layer on the coated PET film of Comparative Example 4.

Comparative Example 4 is the same as Example 1 except that Neocryl A1127 (acrylic polymer) was substituted for the polyester emulsion used in Examples 1 and Comparative examples 1-3 as shown in Table 1. The SEM micrographs shown in FIG. 6 show that the surface is rough but the particles are rounded off due to the distribution of the lower Tg of the Neocryl A1127 acrylic polymer binder. The gloss level of Comparative Example 4 is acceptable, but the paint adhesion was not acceptable.

Comparative Example 5

Comparative Example 5 is essentially the same as Example 1 only with 1 wt. % less silica particle loading as shown in Table 1.

Figure 7:
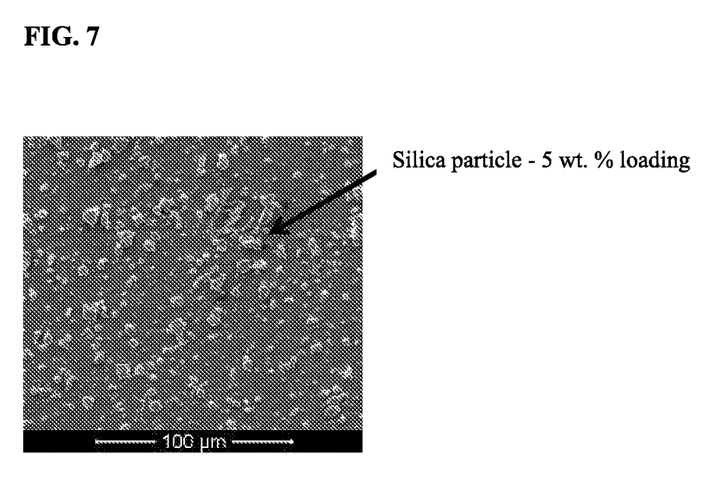
FIG. 7 shows the SEM micrographs showing the surface topography of the coating layer on the coated PET film of Comparative Example 5.

The SEM micrographs shown in FIG. 7 show a rougher surface than in Example 1 but the gloss is higher indicating that silica particle loading of 6 wt. % or greater is preferable to obtain optimal particle height and distribution to produce a 60 degree gloss of about 20 GU. Also paint adhesion of Comparative Example 5 was not as good as that of Example 1.

Summary of Testing

FIG. 10 (Table 3) summarizes the test results of testing the films of Example 1 and Comparative Examples 1-5.

Example 1 is shows the preferred formulation for an inline matte coating. It has the best combination of low gloss, low coat weight with the best paint adhesion.

Comparative Example 1 shows that coating offline with the same formula but with higher coat weight does not achieve a comparable gloss. In fact, more coat weight is detrimental to paint adhesion.

Comparative Example 2 has a slightly higher coat weight and attempts use the synergistic effect of utilizing 2 types of silica particles to reduce the gloss level. Test results show that this is not the case. Gloss units remain high at 46 as opposed to 20 in example 1 and paint adhesion decreases from 0% tp 30%. Micrographs indicate poor coating distribution.

Comparative Example 3 shows an addition of another pigment, an organic pigment, polymethyl methacylate, in combination with the silica at a combined loading level of 8.3% is less effective than example 1 in producing the matte surface.

Comparative Example 4 exchanges the polyester emulsion of example 1 with an acrylic emulsion and keeps the silica loading at ~6% by weight. This produces an acceptable matte surface but has unacceptable paint adhesion.

Figure 8:
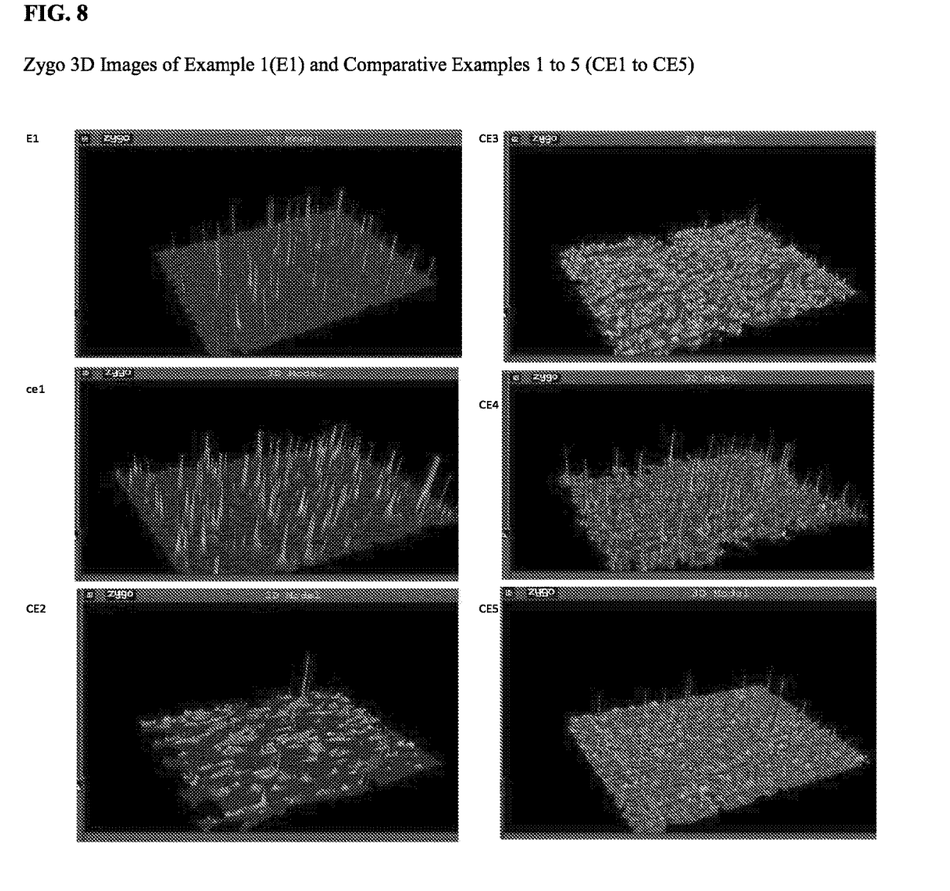
FIG. 8 shows Zygo 3D images of Example 1 (E1) and Comparative Examples 1 to 5 (CE1 to CE5).
Figure 11:
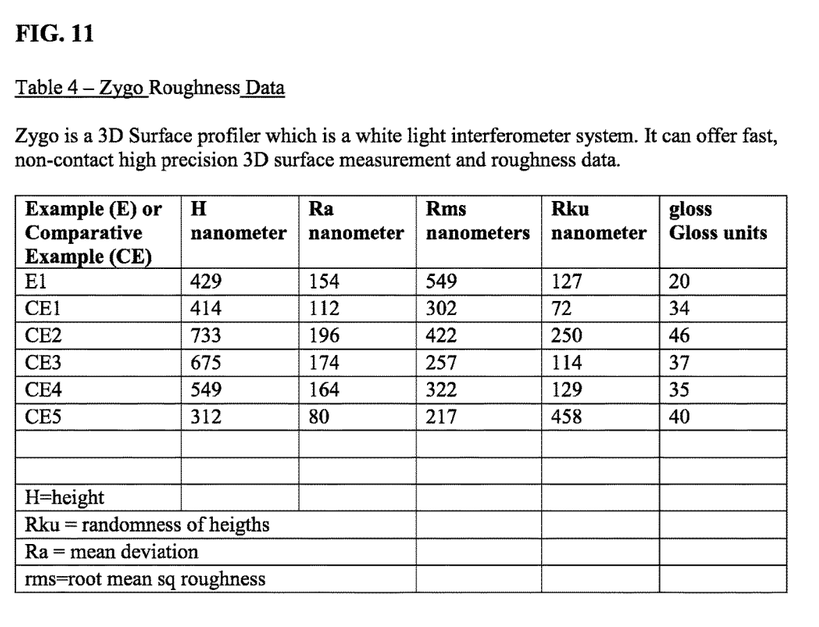
FIG. 11 is Table 4 which summarizes the roughness data of the films of Example 1 and Comparative Examples 1-5.

Comparative Example 5 reduces the silica level from 6% to 5% and there is a noticeable difference in matting. Gloss increases from 20 GU to 31 GU. FIG. 8 shows the surface roughness profiles of the coating of Example 1 and Comparative Examples 1 to 5 as measured by Zygo 3D Surface Profiler. FIG. 11 (Table 4) summarizes the roughness data of the films of Example 1 and Comparative Examples 1-5.

Figure 9:
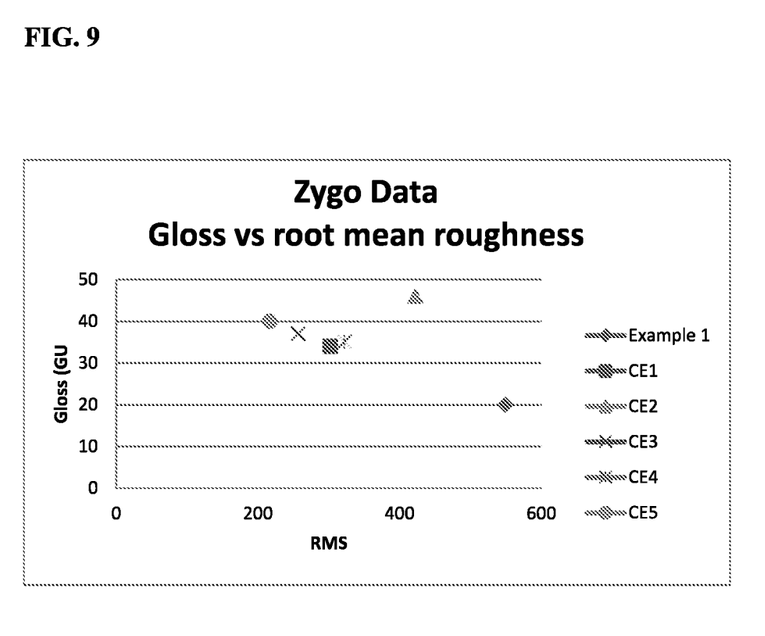
FIG. 9 shows the correlations between gloss and root mean square roughness (rms) of the coatings of Example 1 and Comparative Examples 1 to 5.

FIG. 9 shows the correlations between gloss and root mean square roughness (rms) of the coatings of Example 1 and Comparative Examples 1 to 5. One notices that the gloss is inversely proportional to (rms) except for Comparative Example 2 wherein two types of particles were used: 2.8 wt. % Gasil HP 210 (hydrophobic silica particles) and 2.8 wt. % Areosil OX (hydrophilic silica particles)

Test Methods

Coat weight—Gravimetric method—Samples are cut in 4×4 inch and weighed on a Mettler analytical balance. The coating is washed off with a solvent such as Acetone and reweighed on the balance the difference in weight times the factor 97 is the weight in gram per square meter (gsm).

Gloss—Gloss was measured using a BYK Micro-Tri glossmeter. 20, 60, 85 degree gloss readings are available on the instrument. For this test the 60 degree measurement angle was used because it is recommended for semigloss paints and plastics. The film is put into a jig which holds the film taut. The instrument is placed on the surface after calibration and activated. The gloss reading is displayed on the panel as Gloss Units. Three measurements are taken on each sample and averaged.

Paint Adhesion—This test follows the ATSM standard D3359-09. Paint adhesion was evaluated using a cross hatch tape test. A semi-gloss paint was applied to the coated surface with both a paint brush and roller. Paint was let to set for 24 hours before testing. A razor blade was used to lightly cut the paint/coating surface. 4 cuts in 1 direction and 4 cross cuts overlapping the previous cuts in a perpendicular direction. 810 3M tape was used to cover the scored area. The tape was pressed down with heavy thumb pressure. Tape was left for 5 minutes before pulling off briskly at a 180 degree angle. The area was judged by how much paint was removed. 0% to less than 10% of paint removed is excellent. Good equals 10% to less than 20% of paint removed. Fair equals 20% to less than 30% of paint removed. Poor equals >30% of paint removed.

Viscosity—Viscosity was measured with a DV-E Brookfield viscometer. A number 2 spindle was used at 100 rpms. The spindle is lowered into the coating liquid and activated. The viscosity is directly read on the display in centipoise (cps).

Coefficient of friction (COF) is measured in accordance with Tappi Test Method T 815.

All US patents and patent publications disclosed herein are incorporated herein in their entirety by references.

The invention claimed is:

1. A multi-layer biaxially oriented polyester (BOPET) film comprising at least one BOPET film layer and at least one coating layer comprising a polyester polymer and particles that are partially or fully embedded in the coating layer, wherein the particles have an average particle size of about 4 to 8 microns, the coating layer has a gloss of 25 GU or less measured by a 60 degree glossmeter, and the paint adhesion crosshatch test value as per ASTM D3359-09 is 10% or less.

2. The film of claim 1, wherein the coating layer the particles are 30-60 wt. % of the coating layer.

3. The film of claim 1, wherein the coating layer the particles are 40-50 wt. % of the coating layer.

4. The film of claim 1, wherein the coating layer has a coat weight of 1 gram per square meter (gsm) or less.

5. The film of claim 1, wherein the coating layer has a coat weight of 0.5 gram per square meter (gsm) or less.

6. The film of claim 1, wherein the coating layer further comprises a crosslinking agent.

7. The film of claim 1, wherein the crosslinking agent comprises a carbodiimide crosslinker, a glyoxal crosslinker, a carbodiimide crosslinker, an epoxy functional crosslinker or combinations thereof.

8. The film of claim 1, comprising at least two BOPET film layers.

9. The film of claim 1, wherein the coating further comprises a release agent.

10. The film of claim 1, wherein the coating layer further comprises an antimicrobial additive.

11. The film of claim 1, wherein the particles comprise treated silica particles.

12. The film of claim 1, wherein the coating layer is applied to the at least one BOPET film layer inline during manufacture of the at least one BOPET film layer.

13. The film of claim 1, wherein the coating layer is not applied offline to the at least one BOPET film layer after manufacture the at least one BOPET film layer.

14. The film of claim 10, wherein the antimicrobial additive comprises triclosan.

15. The film of claim 11, wherein the treated silica particles comprise hydrophobic silica particles.

16. The film of claim 11, wherein the treated silica particles comprise substantially no hydrophilic silica particles.

17. The film of claim 12, wherein the coating is applied to the at least one BOPET film layer after the machine direction orientation (MDO) of the at least one BOPET film layer and the coating is dried during the transverse direction orientation (TDO) of the at least one BOPET film layer.

18. The film of claim 12, wherein the coating layer is applied to the at least one BOPET film layer as a polyester polymer emulsion containing the particles.

19. The film of claim 13, wherein the coating is applied to the at least one BOPET film layer after the machine direction orientation (MDO) of the at least one BOPET film layer and the coating is dried during the transverse direction orientation (TDO) of the at least one BOPET film layer.

20. The film of claim 13, wherein the coating layer is applied to the at least one BOPET film layer as a polyester polymer emulsion containing the particles.

* * * * *